United States Patent [19]

James

[11] Patent Number: 5,363,937
[45] Date of Patent: Nov. 15, 1994

[54] BATTERY OPERATED TRACKED VEHICLE

[75] Inventor: M. Elmer James, Mendon, Utah

[73] Assignee: LMC Operating Corp., Logan, Utah

[21] Appl. No.: 962,922

[22] Filed: Oct. 19, 1992

[51] Int. Cl.5 .................. B62D 11/04; B60L 11/10
[52] U.S. Cl. ................... 180/192; 180/6.5; 180/6.28
[58] Field of Search ............. 180/6.28, 6.48, 6.5, 180/65.6, 65.7, 192

[56] References Cited

U.S. PATENT DOCUMENTS

| | | | |
|---|---|---|---|
| 3,183,990 | 5/1965 | Edwards | 180/6.5 X |
| 4,102,292 | 7/1978 | Hunter et al. | 180/6.5 X |
| 4,331,208 | 5/1982 | Kolthoff et al. | 180/6.5 X |
| 4,347,907 | 9/1982 | Downing, Jr. | 180/65 |
| 4,449,598 | 5/1984 | Hoenes et al. | 180/6.5 |
| 4,554,989 | 11/1985 | Gruich et al. | 180/6.5 X |
| 4,986,377 | 1/1991 | Moriarty | 180/6.5 |
| 5,004,944 | 4/1991 | Fisher | 310/266 |

OTHER PUBLICATIONS

High-Power Density & High-Efficiency Motors for Electric Vehicle Applications-H. Huang, W. M. Anderson, E. F. Fuchs Prepared for Presentation at ICE-M-MIT, Aug. 13-15, 1990.
Journal of Terramechanics, vol. 28, No. 1, pp. 79-85, 1991, Entitled Electric, All-Wheel-Drive, Tracked Vehicles, J. G. Hetherington.
SAE Technical Paper Series Entitled An Electric Van with Extended Range-William M. Anderson, Feb. 26 thru Mar. 2, 1990.

Primary Examiner—Kenneth R. Rice
Assistant Examiner—F. Zeender
Attorney, Agent, or Firm—A. Ray Osburn

[57] ABSTRACT

A tracked vehicle (10) propelled by a pair of direct current electric motors (35) operating through a power train to a pair of endless tracks (11). Each power train operates a track drive sprocket (14) through a state of the art torque hub. Electric energy is applied to the motors from a battery pack (13) carried by the vehicle, acting in conjunction with a power control and distribution unit which directs the electrical energy from the batteries as needed. Braking of forward motion of the vehicle is accomplished in part by regenerative use of the motors, each as a generator feeding electricity back to the battery pack and consequently braking the vehicle's motion by the resistance of rotation of the armature rotor.

5 Claims, 10 Drawing Sheets

PRIOR ART

FIG. 10

PRIOR ART

FIG. 11

PRIOR ART

VEHICLE POWER AND CONTROL SYSTEM

FIG. 23

THE ECPM WITH ITS POWER AMPLIFIER

BATTERY OPERATED TRACKED VEHICLE

BACKGROUND OF THE INVENTION

1. Field

The field of the invention is power and power transmission systems for tracked vehicles, and more particularly those utilizing electric power.

2. State of the Art:

Both-mechanical and hydraulic power transmission systems have been used in tracked vehicles to transfer the power from engines to track drive shafts. In the mechanical systems, differentials have been extensively used. In these systems, vehicle steering has been by overdriving the track drive shaft on the side of the vehicle away from the direction of turn, braking the drive shaft on the side toward the turn, or combination of both. Some differentials have also utilized internal braking devices to slow the rotation of the power output shaft linked with the track drive train on the side toward the turn, while increasing the rotation of the opposite power output shaft. Other differential systems have incorporated two oppositely extending track drive power output axles and two rotating braking axles each extending oppositely outside the differential transverse to the vehicle, along with a brake external to the body of the transmission mounted on each of the braking axles. Such a system is disclosed in U.S. Pat. No. 4,377,094. Brakes, generally of the liquid disc type, have been disclosed for directly braking the wheels of vehicles other than tracked vehicles, for example, in U.S. Pat. Nos. 2,940,549, 2,955,682, 2,971,612 and 2,928,504.

Another common means of powering the vehicle tracks employs an internal combustion engine, preferably diesel, to provide pressurized hydraulic fluid. Each track drive shaft is provided with a hydraulic motor individually supplied with pressurized hydraulic fluid from a common reservoir. Since the separate shaft motors are individually controllable, steering is accomplished by powering one or the other of the shafts to a greater degree than the other. The hydraulic motors are reversible, so that sharp turns are possible by reversing the direction of power on the two track drive shafts. The shaft motors of such vehicles normally remain engaged even if steering levers provided are in neutral position, so that positive braking must be applied to each shaft to keep the vehicle stationary, as long as the engine is running.

Both the hydraulic and mechanical systems exhibit inefficiencies including that of the engine and the power train, the mechanical system from mechanical friction losses and the hydraulic system from fluid friction losses resulting in temperature rise in the fluid which must be wastefully dissipated.

Many electrically propelled vehicle concepts have been studied and prototypes of some have been constructed and tested. Individual electric wheel motor propulsion systems, similar to the hydraulic propulsion system described above have also been known. U.S. Pat. No. 4,347, 907 discloses an all electric a.c. powered farm tractor, with wheel induction motors controlled by cyclo-converters. The same reference makes mention of a Le-Tourneau "LetroStaker", a log stacker with wheels driven by d.c. motors. The well known Le-Tourneau earth-moving machine is also powered by wheel motors. Electrically powered tracked vehicles have also been investigated. U.S. Pat. No. 1,863, 504 discloses an electrically driven track-laying vehicle having a pair of tracks individually powered by electric motors acting through drive chains upon a sprocket shaft. A similar system is disclosed in U..S. Pat. No. 2,605,852, intended for use upon electric shovels or mine shuttle cars. U.S. Pat. No. 1,814,996 discloses an electrically powered, tracked cultivator, however utilizing a single motor for driving of both tracks, and U.S. Pat. No. 1,391,529 discloses a similar single motor electrical powered tracked vehicle. Thus, none of the known prior art discloses practical electrical power for tracked vehicles for use upon snow. Those designs which have proved practical include the earth moving and log stacking applications, and perhaps the agricultural applications, all of which not only do not find weight highly objectionable, but even desirable to provide needed traction. Another study, including construction and test of a model, is found in the Journal of Terra Mechanics, Vol. 28, No. 1 pp. 79–85, 1991. The study investigates the use of multiple electric motors to power a track, to reduce tensile stress thereupon. Lip service is paid to lower weight motors, but a large number of motors are used, again relegating the study as applicable to vehicles such as those discussed above. Considerable analysis and design has been expended upon electrically powered vehicles for roadway use. One such effort is described in SAE Technical Paper Series, of the Engineering Society for Advancing Mobility Land, Sea, Air and Space, 400 Commonwealth Drive, Warrendale, Pa. 150960001, 0001, U.S.A., presented at the International Congress and Exposition, Detroit, Mich. Feb. 26–Mar. 2, 1990. The study investigates the use of individual wheel motors in a battery powered system. Again, achieving minimum vehicle weight in the design is not of overriding concern, because of operation of the vehicle upon a firm paved roadway, and the study fails to address any critical design concerns relative to tracked vehicles for use on snow.

Prior art propulsion systems for tracked vehicles are also objectionable because of environmental pollution, the engines of course giving off exhaust pollutants, particulate and gaseous. Both the differential and hydraulic motor systems are subject to polluting leakage of fluid upon the slopes.

There is therefore a need for an improved power system for the tracks of tracked vehicles which is capable of improved efficiency and reduced environmental pollution.

BRIEF SUMMARY OF THE INVENTION

The present invention eliminates or substantially alleviates many of the foregoing disadvantages in prior art power systems for tracked vehicles. The inventive power system comprises a battery pack carried by the vehicle, along with a power control and distribution unit which directs the power from the batteries as needed to a pair of electric drive motors each associated with one of a pair of track drive trains. Each train powers a track drive sprocket through a state-of-the-art torque hub. A. fail-safe brake incorporated into each drive train secures the vehicle in stationary position when the power to the drive motors is interrupted. However, for braking of forward motion of the vehicle, the motors are utilized to provide regenerative braking. Each motor is then utilized as a generator feeding electricity back to the battery pack, consequently braking the vehicle's motion by the associated resistance of the rotation of the armature rotor. At lower speeds, however, the disc brake type fail-safe brake used for parking is also used to brake the moving vehicle.

Essential to the efficiency of the track drive system is the use of small, lightweight, high speed motors. The motors utilized operate at rpm's in the range of 7,500 –10,000, compared to 3,000 for traditional electric motors.

The invention incorporates motors that are lightweight and yet provide high power conversion due to high power density, being capable of continuous operation producing in excess of 1.0 horsepower per pound.

High power density per unit weight is effected by utilization of an armature assembly having dispersed conductors which are separated by dispersed-phase flux carrying elements in a manner such that low opposing induced currents are created, as well as low eddy currents, to enable operation of the transducer at high efficiency with high torque being maintainable during high speed operation.

The motors provide high output power for their size, so that lightweight motor designs may be utilized. The brushless motors incorporate permanent magnets and depend upon high speed switching of armature circuits. Rapidly changing current direction is provided by a control unit incorporating a MOSFET based amplifier which processes direct current from the batteries into an alternating form suitable for high speed electronic switching to vary the applied voltages at the motor terminals to control their speeds. In the braking or the regeneration mode, the amplifier converts ac to dc to return kinetic energy to the batteries. Since brakes are often applied during the operation of tracked vehicles upon ski slopes, for example, the regenerative braking significantly increases the efficiency of the system.

It is therefore the principal object of the invention to provide an energy efficient, reduced weight, electrically powered, propulsion system for the tracks of tracked vehicles for use upon the snow of ski slopes and the like.

BRIEF DESCRIPTION OF THE DRAWINGS

The accompanying drawings illustrate complete embodiments of the invention according to the best mode so far devised for the practical application of the principles thereof, and in which.

DETAILED DESCRIPTION OF ILLUSTRATED EMBODIMENTS

Figures 1, 2:
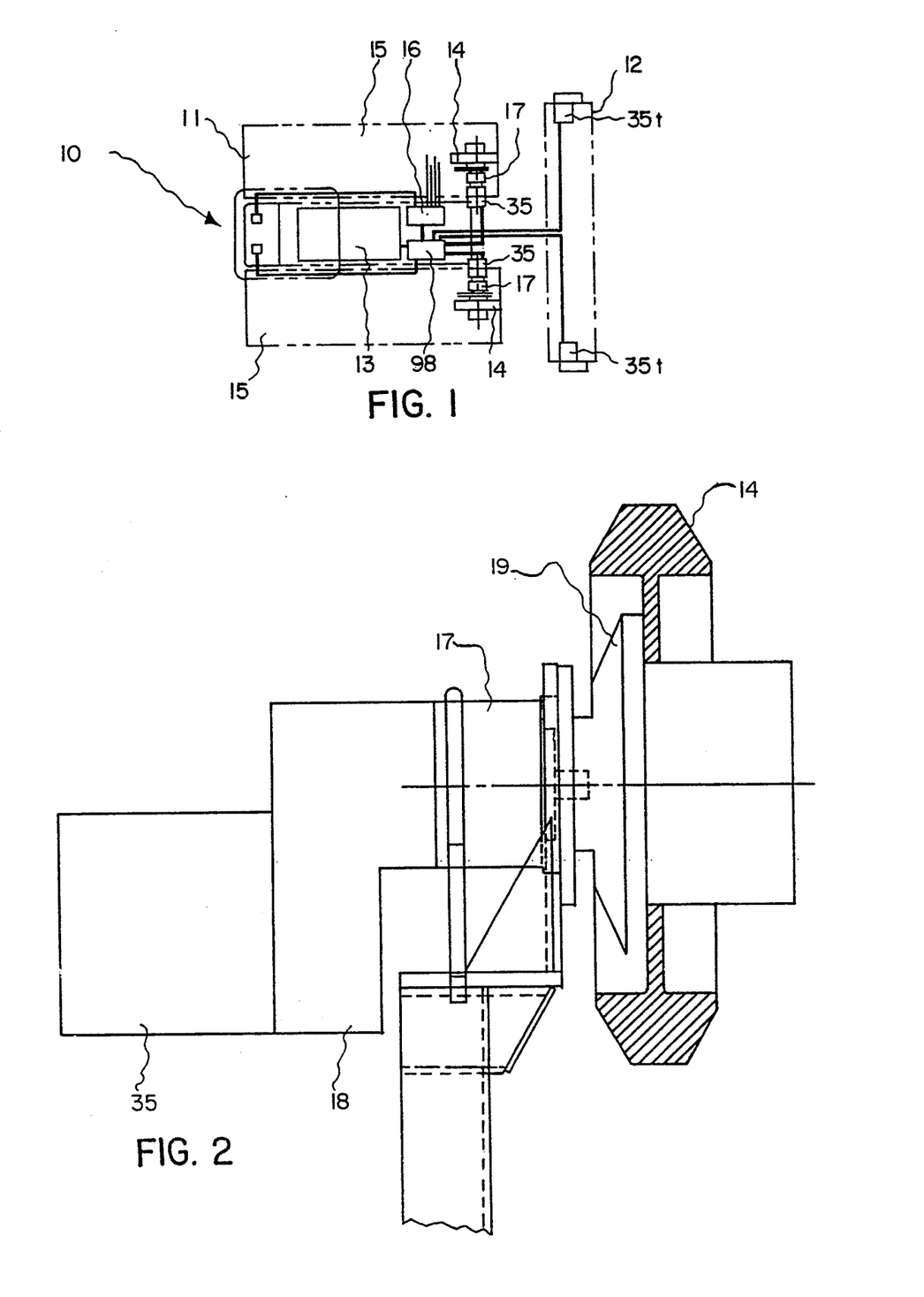
FIG. 1 is a schematic representation of a track powering system in accordance with the invention, indicating also the associated tracked vehicle.
FIG. 2 is a schematic representation of the track powering system of FIG. 1, drawn to a larger scale.

The inventive track powering system 10 for a tracked vehicle 11 is indicated schematically in FIG. 1, propelling a snow grooming tiller 12, for example. Electric propulsion system 10 comprises a battery pack 13, a power control and distribution unit 98, and a pair of electric drive motors 35 each associated with a power train connected to a sprocket 14 driving the tracks 15.

Preferably, vehicle 11 also carries an auxiliary hydraulic system 16, with hydraulic fluid pressurized by an electrically powered pump, not shown. Auxiliary hydraulic system 16 directs fluid for controlling attitudes of plow blades and other implements, and for operation of a low speed, parking, and fail safe disc brake 17. Braking at higher vehicle speeds is mainly accomplished by regenerative use of the electric motors 35 as further explained below. Implement functions involving rotary motion, such as that of the cutter bar, not shown, of tiller 12 are preferably electrically powered. An electric motor 35t, for instance, is illustrated attached to power each end of the tiller cutter bar.

Figure 3:
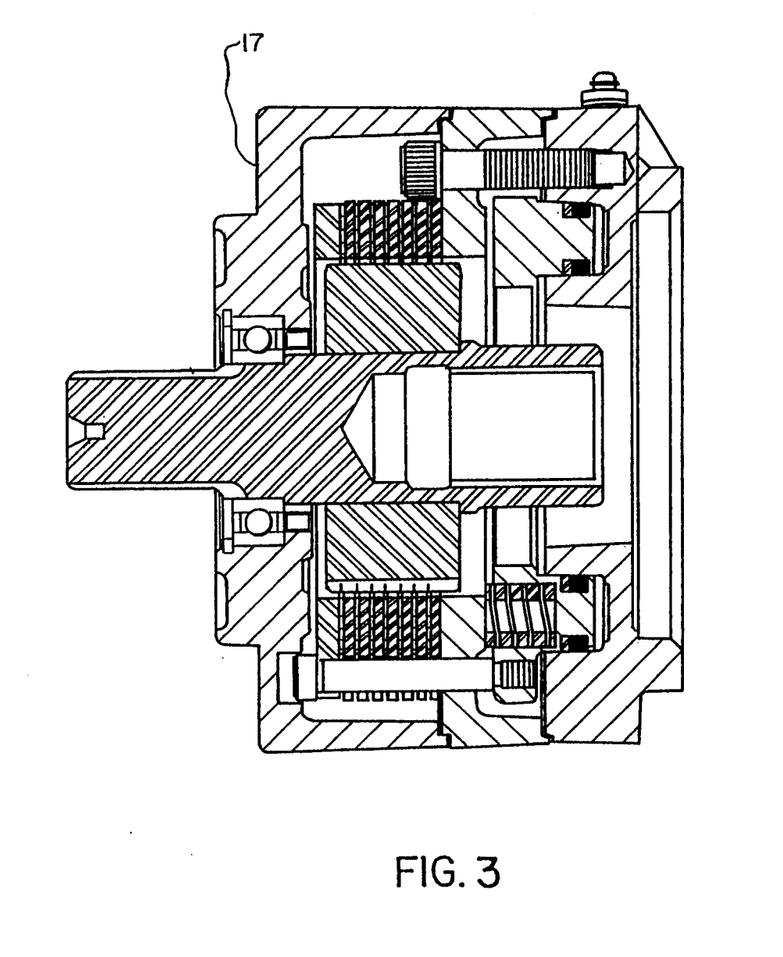
FIG. 3 is a vertical cross-sectional view of the hydraulic fail safe, disc brake indicated in FIGS. 1 and 2, drawn to substantially full scale.
Figure 4:
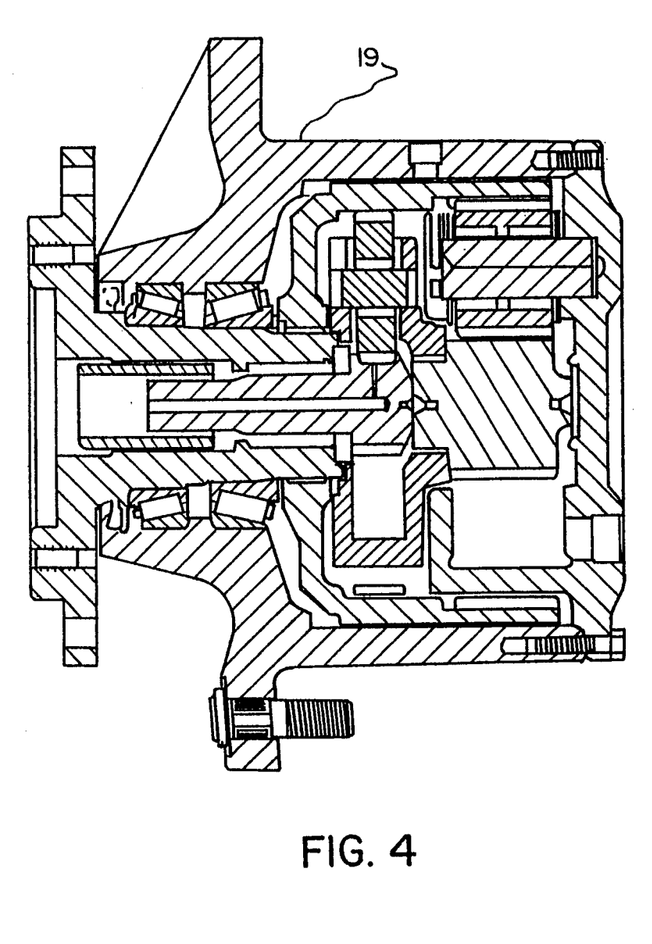
FIG. 4 is a vertical cross-sectional view of the torque hub gear reducer of FIGS. 1 and 2, drawn to a larger scale.
Figure 5:
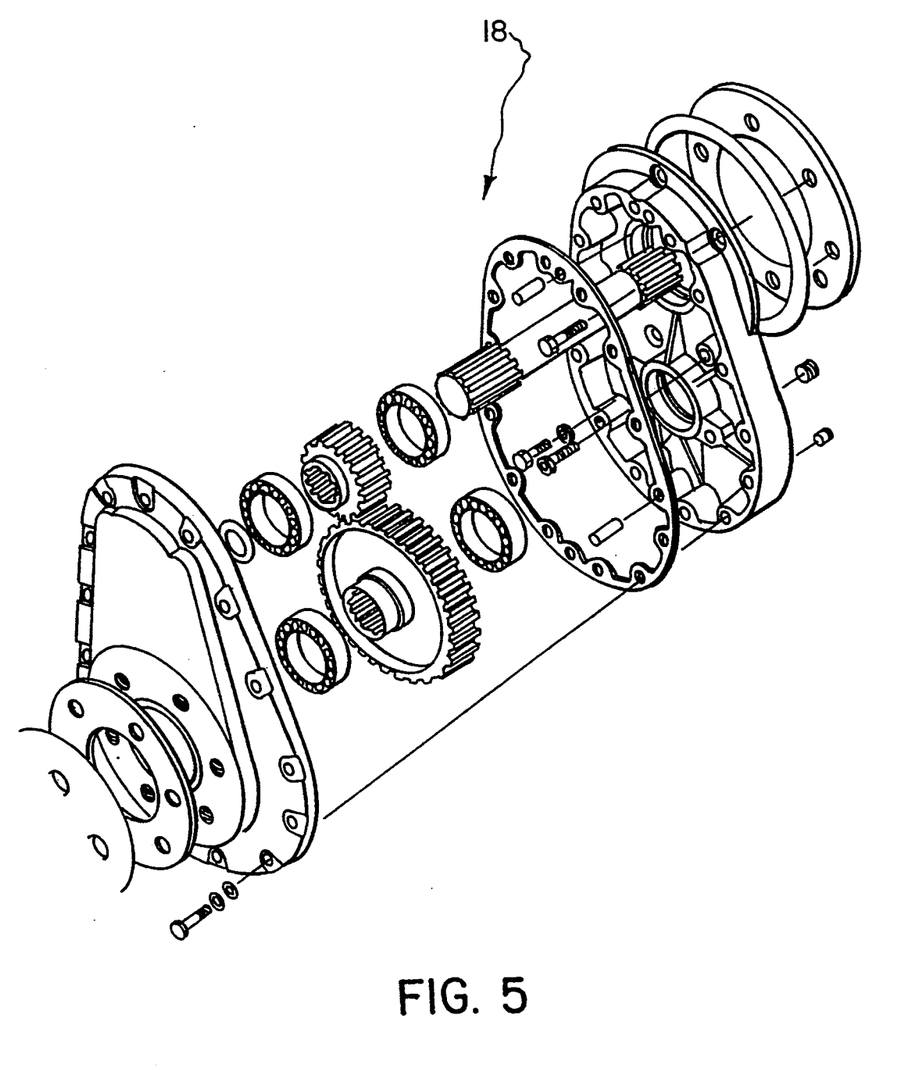
FIG. 5 is an exploded perspective view of the spur gear reduction assembly of FIG. 2, drawn to approximately the same scale.

The power train of one of the endless tracks 15 is shown in more detail in FIG. 2. The high speed, lightweight, electromagnetic motor 35 acts through a conventional spur or helical gear reduction assembly 18 to provide rotary power to a shaft, not shown, of the disc brake 17, which shaft engages another shaft, not shown, of a torque hub 19, a two-stage planetary gear reduction assembly. Hub 19 is in turn secured to track engaging sprocket 14. The brake and torque hub assemblies are of types employed in prior art hydraulically powered tracked vehicles, and are of the types illustrated in FIGS. 3 and 4 respectively. However, the high rpm motor 35 must first be reduced to that of prior art track drive trains, for example. As described in greater detail below, motor 35 maintains high torque at 7,500 to 10,000 rpm, with sufficient kinetic energy to deliver at least one horsepower for each pound of its weight. The motor rpm is reduced to about ¼ by gear reducer 18. (FIGS. 2 and 5) Torque hub 19 further reduces the rpm by a ratio of 19:1, sprocket 14 then rotating at about 110 rpm, consistent with a 5 mph vehicle speed.

Electric propulsion of vehicles, including tracked vehicles, has been practically accomplished where considerable total vehicle weight may be tolerated. Bulldozers and earth movers typically operate upon firm unyielding ground, and in fact need considerable weight for traction. Highway vehicles may also find higher weight beneficial. However, for tracked vehicles operating upon snow, the compressible base renders the weight of prior art electric drive motors unacceptable, even with very large tracks being used to reduce the bearing stress upon the snow. However, the track sizes are also limited, for access to buildings and for acceptable maneuverability, so that the gross vehicle weight, including the electric drive motors, remains critical. As put forth above, track powering system 10 incorporates drive motors 35 which provide high power at low weight and with high efficiency.

High power density per unit weight is achieved in motors 35 by using an armature assembly with dispersed conductors separated by dispersed-phase flux carrying elements designed and arranged to produce low opposing induced currents and low eddy currents. This enables operation of the motor at high speed, with high torque and high efficiency. This type of motor is fully described subsequently herein, and in U.S. Pat. No. 5,004,944. The motor design permits it to operate at high speeds without excessive alteration of the magnetic flux pattern, so that high torque is maintained.

An electromagnetic motor is now described herein, including alternate embodiments thereof. It is meant to be realized that the motor may be utilized also as an alternator or generator, depending on whether an electrical signal is conveyed to the armature (commonly through a commutator or equivalent structure) to create a force causing movement of the magnetic flux producing structure relative to the armature thus driving the shaft, or whether the shaft is rotated to thereby cause movement of the magnetic flux producing structure relative to the armature to create an electromotive force which, in turn, can cause movement of current along the conductors of the armature to be coupled from the conductors as an electrical signal, as is well known.

Figure 6:
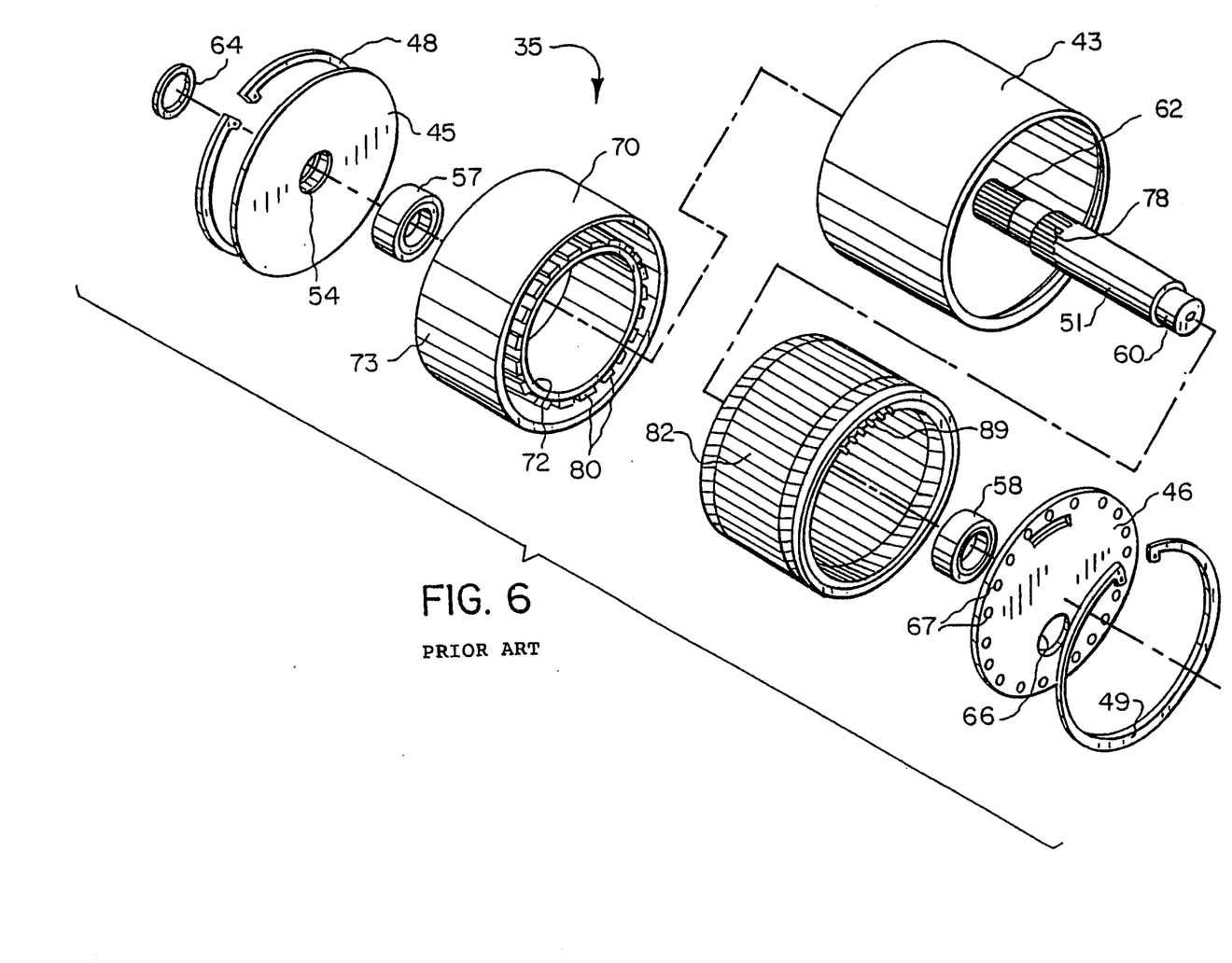
FIG. 6 is an exploded isometric view of a rotary implementation of the electromagnetic transducer of this invention.
Figure 7:
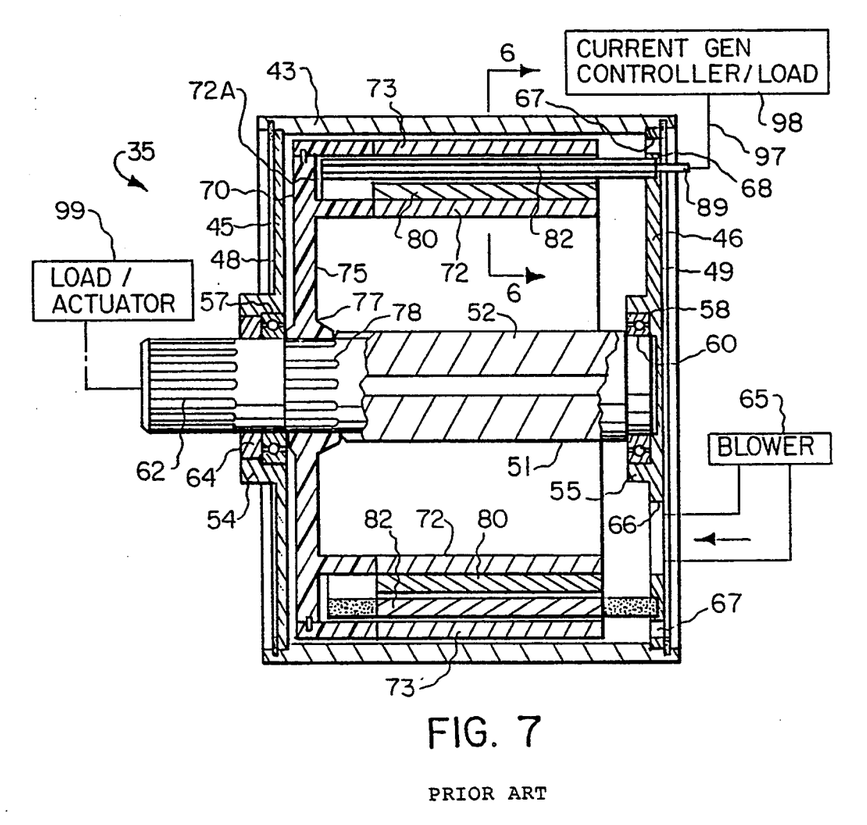
FIG. 7 is a side sectional view of the assembled electromagnetic transducer as shown in FIG. 6, along with additional elements illustrated in block form to better illustrate the invention.

Electromagnetic motor 35, as best shown in FIGS. 6 and 7, is lightweight and yet is capable of delivering high power, with the motor being a high power density device that is well suited, for example, for use in conjunction with self-propelled vehicle applications including tracked vehicles.

As shown in FIGS. 6 and 7, electromagnetic motor 35 includes an outer cylindrical housing 43, which housing has front and rear end plates 45 and 46 positioned at the opposite ends of the cylindrical housing by means of snap rings 48 and 49.

A shaft has a central portion 52 extending through the cylindrical housing with the shaft being mounted in central hubs 54 and 55 of end plates 45 and 46, respectively, by means of bearings 57 and 58 so that the central portion of the shaft is coaxially positioned with respect to the cylindrical housing, the reduced diameter rear portion 60 of the shaft is mounted in bearing 58, and the front portion 62 of the shaft extends forwardly of front end plate 45, with seal 64 being positioned in hub 54 adjacent to bearing 57.

As also shown in FIG. 70 blower 65 is positioned adjacent to back, or rear, end plate 46, which plate includes offset air intake aperture 66 and a plurality of exhaust apertures 67 spaced about and near the periphery of the end plate. When so used, the motor thus operates in a gas (air) medium (as opposed to a fluid medium which could include oil or the like, for example, as do some known motors). In addition, an arcuate aperture 68 is positioned to allow armature conductor connections through end plate 46.

As best shown in FIG. 7, rotor 70 has a double shell configuration provided by inner and outer spaced cylindrical portions, or walls 72 and 73, which extend normally from mounting disk 75 so that cylindrical portions 72 and 73 are coaxial with, and inside, cylindrical housing 43 and define an annular gap 72A therebetween. Mounting disk 75 has an annular mounting portion 77 which is-received on splined portion 78 of shaft 51 inwardly of bearing 57.

Inner cylindrical portion 72 of rotor 70 has magnetic elements 80 mounted thereon, which magnetic elements are shown to be permanent magnets (but electromagnets could be utilized, if desired). Cylindrical portions 72 and 73 are formed of highly magnetically permeable with low hysteresis loss magnetic material (such as iron or steel, for example), while magnetic elements 80 are high strength permanent magnets, which magnets are preferably formed of neodymium boron ferrite (NdFeB), but may also be formed of barium ferrite ceramic (BaFe ceramic), samarium cobalt (SmCo), or the like.

Armature 82 comprises an annular member at least partially disposed within gap 72A and is fixed with respect to housing 43, and is mounted on rear end plate 46, as indicated in FIG. 7, so that rotor 70 rotates relative to armature 82 (as well as to housing 43). Armature 82 is thus a stationary cylindrical shell element that extends through the length of cylindrical housing 43 between the inner and outer cylindrical portions 72 and 73 of the rotor.

Figure 8:
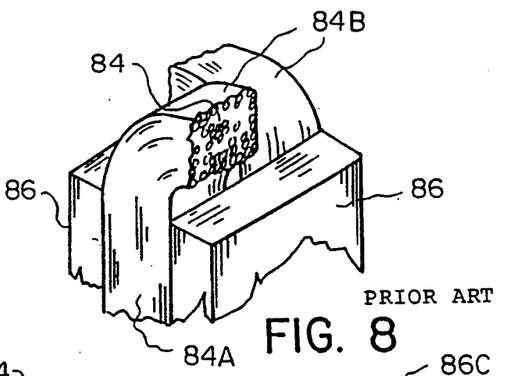
FIG. 8 is a partial isometric view showing the arrangement of the dispersed conductors and flux carrying elements of the electromagnetic transducer shown in FIGS. 6 and 7.
Figure 9:
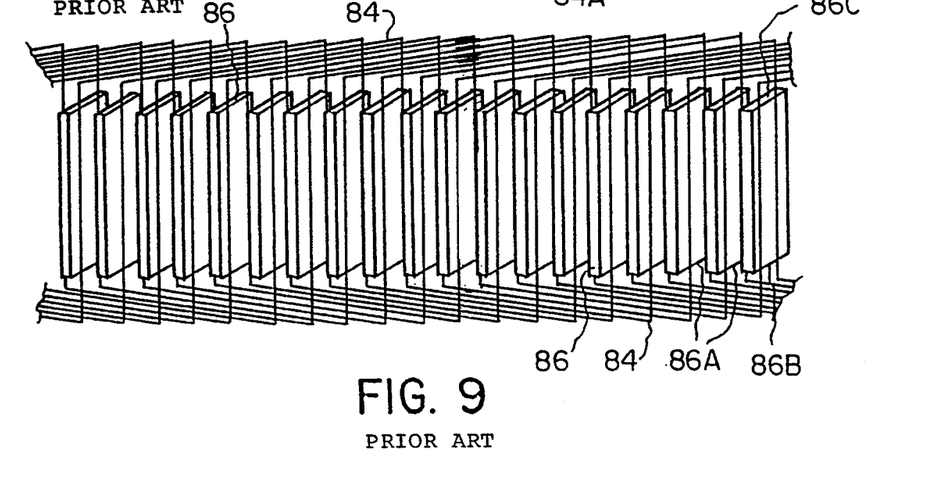
FIG. 9 is a diagram illustrating a typical arrangement of a two layer winding formed by the dispersed conductors and illustrating the flux carrying elements positioned between turns of the windings.
Figure 10:
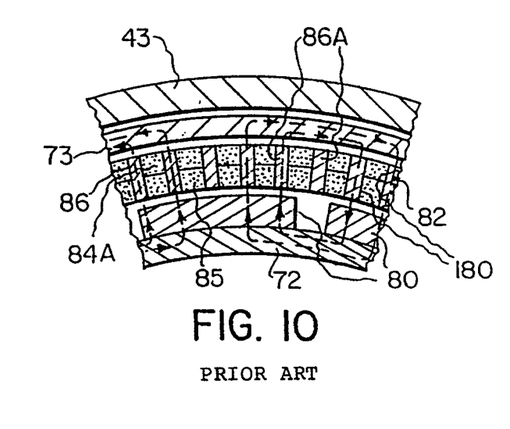
FIG. 10 is a sectional view taken through lines 6—6 of FIG. 7, with the magnetic flux path in the transducer also being illustrated.
Figure 15:
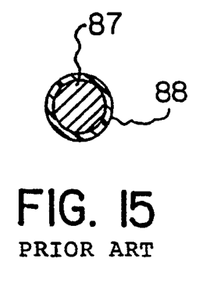
FIG. 15 is a partial end view illustrating a dispersed conductor, as best shown in FIG. 8, and illustrating the insulation layer around the conductor.

It is important to this invention that armature 82 include dispersed conductors 84 as best shown in FIG. 8, different sections 85 of which are positioned between flux carrying elements 86 as best shown in FIG. 10. The conductors 84 have discrete spaced apart active regions 84A, as shown in FIGS. 8 and 9. As shown in FIG. 10, active regions 84A have a substantially rectangular cross section. Between active regions 84A are a plurality of discrete elongated open space areas 86A. (See FIGS. 9 and 10). A flux carrying means formed of a plurality of flux carrying members 86 of compressed iron powder are interposed in open space areas 86A between active regions 84A. Dispersed conductors 84 are preferably formed from a bundle of small diameter copper wires 87 surrounded by insulating material 88 (as best shown in FIG. 15), with conductors 84 being wound into a linking pattern, as indicated by way of example in FIG. 9, with opposite ends of the wire bundles being connected to connectors 89 extending through aperture 68 in end plate 46, as indicated in FIG. 7.

Conductors 84, as best shown in FIG. 8, are formed into a bundle throughout the armature (as by being wound in a ring, for example), and each turn of the wire windings has a flux carrying element 86 therebetween, as shown in FIGS. 9 and 10, with a typical winding, which constitutes a structurally integral annular winding structure, being conceptually illustrated in FIG. 9.

Flux carrying elements 86 are preferably iron (at least in part), and extend between the active region or length 84A of conductors 84. Elements 86 have radially inner 86B and radially outer 86C elongated edges. (See FIG. 9) Conductors 84A connect the active lengths of each other in an appropriate pattern, such as a wave winding as shown, by way of example, in FIG. 9. The flux carrying elements 86 are preferably dispersed-phase flux carrying members to handle the high frequency magnetic field reversals with low opposing induced currents and low eddy current losses. Because iron is electrically conductive, it must be dispersed to avoid (or at least minimize) the creation of opposing induced currents. It has been found that a suitable flux carrying element 86 can be pressed from fine (10–100 micron) iron powder previously reactively coated with phosphate insulation and using "B" stage epoxy and wax as binders.

By providing conductors comprising a plurality of small diameter wires with dispersed-phase flux carrying elements between turns of the wires, opposing induced currents are minimized sufficiently so as to allow operation of the electromagnetic motor at high speeds and at high torque with such operation being conductable at high efficiency. In a working embodiment, a stationary armature shell incorporating windings of copper and powdered iron bars to carry the magnetic flux, and impermeated with glass reinforced novolac epoxy insulation material cast as a binding agent 180 between the windings and bars, has been successfully utilized.

Figure 21:
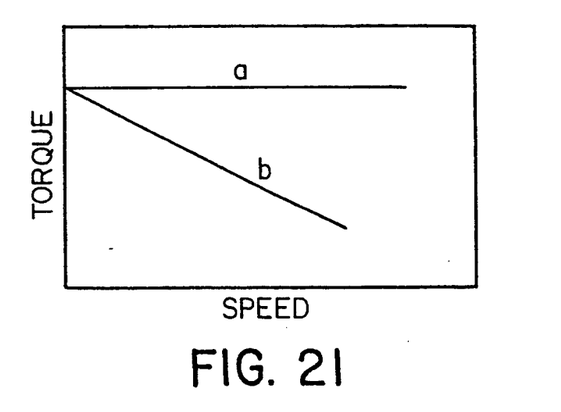
FIG. 21 is a graph illustrating the relationship between torque and speed for a conventional transducer b and for the transducer of this invention a, FIG. 22 is a graph illustrating eddy current, hysteresis and windage losses at different speeds of one example of the transducer of this invention.

It has been found that the torque output can be maintained nearly constant even with increases in rotor speed, as illustrated in FIG. 21 by line a. This is quite unlike prior art devices wherein torque was found to drop off rapidly with increased speed when solid bars were utilized as conductors and as flux carrying elements, as illustrated in FIG. 21 by line b. The combination of high torque and high speed, made possible in the electromagnetic motor, produces high power density.

As shown in FIG. 10, armature 82 (formed by the dispersed conductors 84 and flux carrying members 86) are closely spaced with respect to magnets 80 positioned about the inner cylindrical wall 72, and also closely spaced with respect to cylindrical wall 73, with walls 72 and 73 providing inner and outer return paths, respectively, for the magnetic flux. Some typical flux paths have been illustrated in FIG. 10. As shown, these flux paths are loops each of which penetrates the armature twice, passing principally through the flux carrying members 86. The flux carrying members thus allow a thick armature to maintain a high flux density which is essential to high torque.

Figure 11:
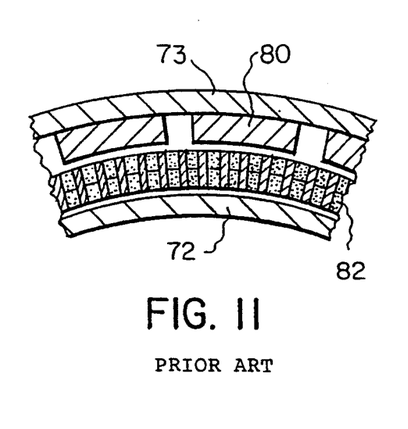
FIG. 11 is a partially cut-away view similar to that of FIG. 10 but illustrating an alternate embodiment of the electromagnetic transducer of this invention.
Figure 12:
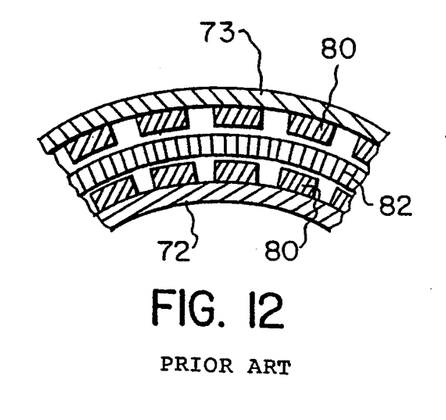
FIG. 12 is a partially cut-away view similar to that of FIG. 10 but illustrating another alternate embodiment of the electromagnetic transducer of this invention.

As indicated in FIG. 11, the electromagnetic motor may also be configured by placing magnets 80 on outer wall 73 (rather than on inner wall 72). As indicated in FIG. 12, the electromagnetic motor may also be configured by placing magnets 80 on both inner and outer walls 72 and 73.

Figure 13:
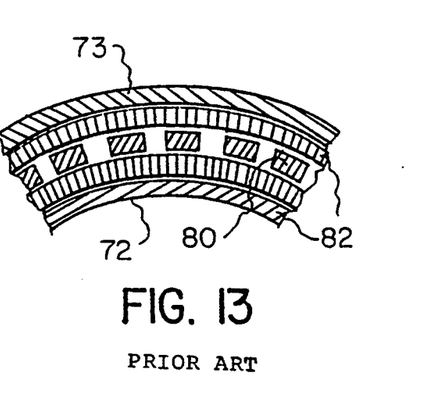
FIG. 13 is a partial cut-away view similar to that of FIG. 10 but illustrating still another alternate embodiment of the electromagnetic transducer of the invention.
Figure 14:
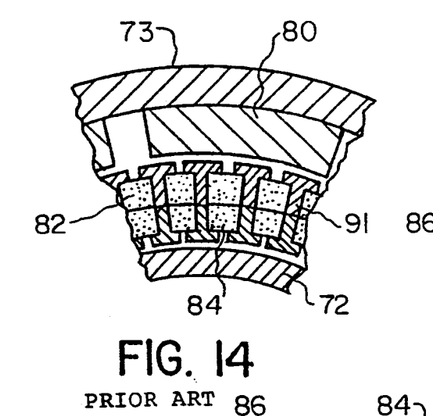
FIG. 14 is a partial cut-away view similar to that of FIG. 10 but illustrating yet another alternate embodiment of the electromagnetic transducer of this invention.

As indicated in FIG. 13, an armature 82 can also be provided at both sides of magnets 80. In addition, while not specifically shown, it is also to be realized that the electromagnetic motor could be configured by placing additional layers of armature-rotor elements radially inwardly and/or outwardly of that shown in the drawings. While flux carrying members 86 in the above embodiment are rectangular in cross section, the flux carrying members may also be configured by utilizing a non-rectangularly shaped member such as, for example, an I-shaped member 91 (as indicated in FIG. 14) having dispersed conductors 84 extending therebetween.

Figure 16:
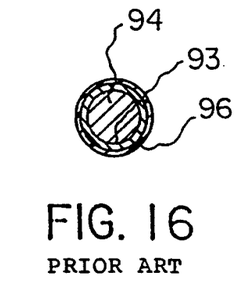
FIG. 16 is an end view similar to that of FIG. 15 but illustrating an alternate embodiment of the armature structure wherein the conductors have a coating of a flux carrying means (iron) thereon utilizable in lieu of the flux carrying elements as illustrated in FIGS. 8 through 14.
Figure 17:
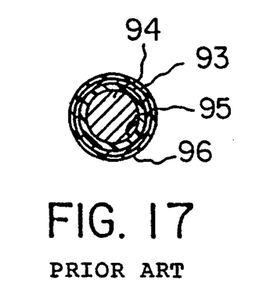
FIG. 17 is an end view similar to that of FIGS. 15 and 16 but illustrating another alternate embodiment of the armature structure wherein insulated conductors have a coating of a flux carrying means (iron) thereon utilizable in lieu of the flux carrying elements as illustrated in FIGS. 8 through 14.

The armature can also be configured as shown in FIG. 16 such that flux-carrying elements 93 are formed as a coating of highly permeable magnetic material (such as iron) on some or all of the dispersed conductors 94. As indicated in FIG. 17, conductors 94 can also have an insulation layer 95 thereon so that insulation layer 95 is between the conductor and the flux carrying element. In either case, an insulating layer 96 covers the flux carrying element (unless it is, of itself, electrically non-conductive).

Figure 18:
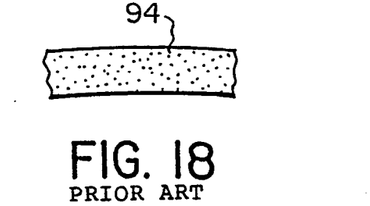
FIG. 18 is a partial view illustrating the use of the embodiment of either FIG. 16 or FIG. 17 as the armature without use of separate flux carrying elements.
Figure 19:
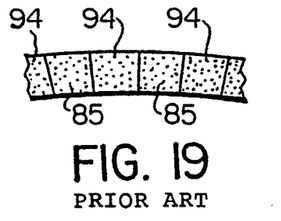
FIG. 19 is a partial view similar to that of FIG. 18 but illustrating use of alternating sections of dispersed conductors and dispersed conductors coated as shown in the embodiment of FIG. 16 or FIG. 17.

When the flux carrying elements are formed as coatings on the dispersed conductors (as indicated in FIGS. 17 and 18), the flux carrying bars (shown in FIGS. 8 through 14) need not be utilized. The conductors 94 may be dispersed with flux carrying elements of the armature (as indicated in FIG. 18) or can be alternated with dispersed conductor sections 85, i.e., dispersed conductors having no flux carrying element coating thereon (as indicated in FIG. 19).

Powdered iron utilized as flux carrying elements 86 (as indicated in FIG. 10) provide three-dimensional phase dispersion, while flux carrying elements 93 coated on the dispersed conductors (as indicated in FIGS. 16 and 17) provide two-dimensional phase dispersion (iron lamination bars, on the other hand, when used as flux carrying elements provide only one-dimensional phase dispersion).

The electromagnetic motor thus includes a magnetic flux producing assembly (having at least one pair of poles which can be embodied by using permanent magnets or electromagnets), and an armature assembly (which intercepts the magnetic flux produced by the magnetic flux producing assembly and has an alternating structure of conductive windings and flux carrying elements, which flux carrying elements can be referred to as armature iron). A winding can be used as the principal component of the armature with the winding consisting of bundles of separate conductors (which are referred to herein as dispersed conductors), with the use of dispersed conductors of fine wire permitting high speed rotation of the rotor when used in conjunction with dispersed-phase flux carrying elements.

The use of multiple, parallel extending, insulated conductors to reduce heating losses at high currents has been heretofore suggested (see, for example, U.S. Pat. No. 497,001, arid it is well known in the motor art as a method to reduce skin effect losses in motors. Skin effect, however, causes losses at load only, whereas eddy current losses, which would be experienced when known devices are rotated at high speed, occur at no load. This distinction is as to the mechanism of the effect.

In the case of conductors of large cross section or conductive flux carrying elements of large cross section, as used at least in some prior known devices, as the-frequency of the magnetic field reversal increases, the magnitude of the induced currents in the bars increases, and the induced currents react with the magnetic field to create a resisting torque which opposes the increase of rotational speed. Thus, known shell type devices are inherently limited to low speed by the reaction torque, and cannot be rotated at high speed and are therefore, unlike the motor used in the present invention, not suitable, for example, for use as traction motors in most practical applications.

A means to displace (i.e., rotate) the magnetic field relative to the armature at high speed must, of course, also be provided so that electric power can be converted into mechanical power in a manner similar to that used by known motors. As indicated in FIG. 7, this can be accomplished by connecting leads 97 between connectors 89 of armature 82 and current generator and controller unit 98 so that unit 98 provides current to conductors 84 to cause rotation of rotor 70, with rotation of rotor 70 causing rotation of shaft 51 to drive a load 99. (In the present invention, a track drive train).

When used as a generator (for regenerative braking), the track drive train causes rotation of shaft 51 which rotates rotor 70 to induce a voltage on conductors 84 and thereby generates electrical current flow from conductors 84 to battery pack 13. While not specifically shown in FIGS. 6 through 19, it is to be realized that the current generator and controller unit (or alternately the armature) includes necessary electric commutation devices, including those devices wherein commutation is performed electronically (as in a brushless dc motor, for example), as well as devices which employ rectifiers instead of commutation (as is often used in power generating applications).

The motor 35 has a significant advantage over a conventional motor by utilization of a minimum amount of iron which undergoes flux reversal. That is, only the iron in the flux carrying elements in the armature is subject to the reversing flux as each pole is passed, and thus low hysteresis losses are experienced. In addition, the effects of flux leakage are reduced so that all of the armature windings experience the total flux change and thus are equally useful at producing torque.

The motor 35 also has significant heat transfer advantages. For this reason, the superior high power to weight ratio is further enhanced. A thin armature is made possible by the armature being made up entirely of insulated conductors except for the necessary volume of the flux carrying members. It is therefore possible to provide cooling to both the inner and outer surfaces of the armature.

By the principles of heat transfer, heat buildup in an armature, with constant surface temperature and uniform internal heating per unit volume, depends on the square of its thickness. For example, compare an armature 0.25 inches thick (as is possible in this invention) to a solid rotor, five inches in diameter (as is common in known devices). The heat buildup in such known devices is some 400 times as great as that of the motor 35 with such an armature. Clearly, the motor 35 can dissipate more heat than any known conventional motor of similar power rating.

Figure 20:
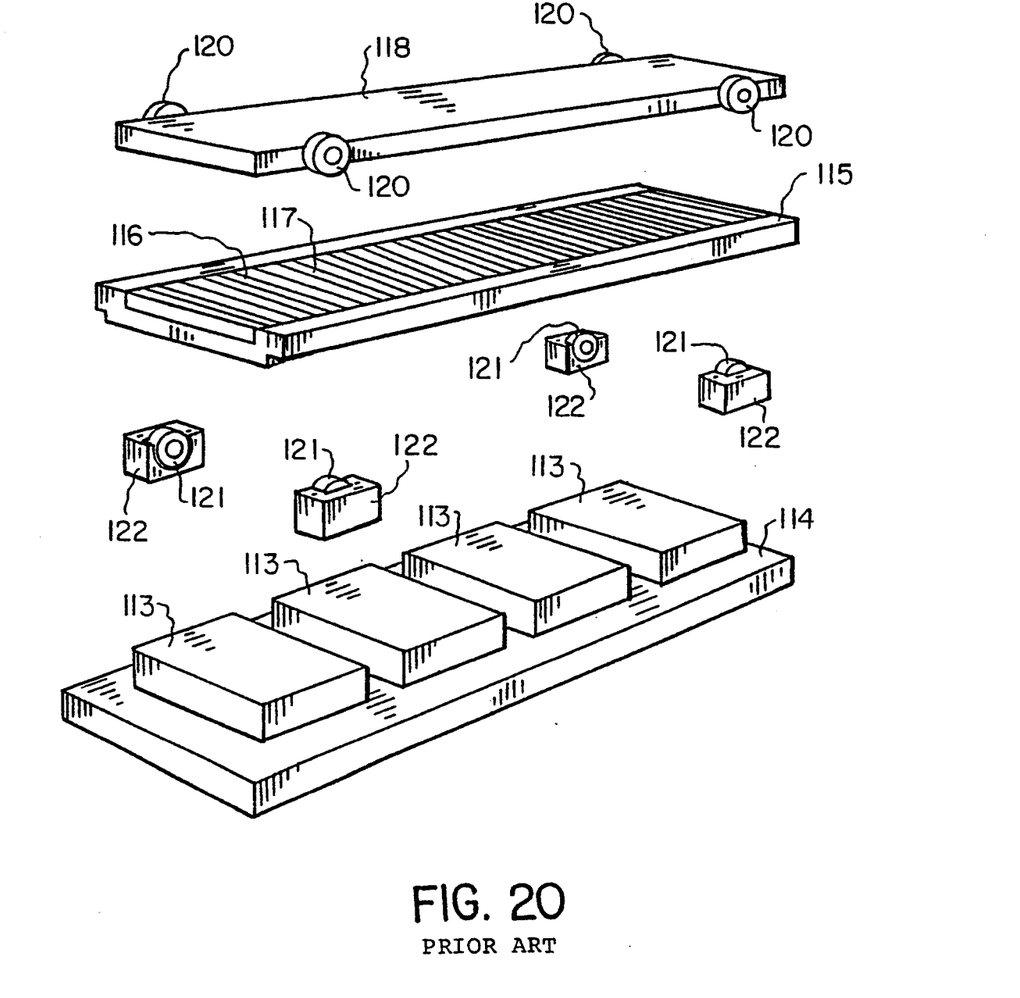
FIG. 20 is an exploded isometric view of still another alternate embodiment of the electromagnetic transducer of this invention, and illustrates a flat linear implementation thereof.

FIG. 20 illustrates a linear reciprocating implementation of an electromagnetic motor in which the structure is flat. As shown, magnets 113 are mounted on flat lower return plate 114. Armature 115 is provided with dispersed conductors 116 and flux carrying elements 117 in the same manner as described hereinabove with respect to the other embodiments illustrated except that the armature is essentially flat rather than cylindrical. An upper return plate 118 is also provided, and armature 115 is movable linearly with respect to, and between, lower and upper plates 114 and 118 by means of rollers 120 mounted on the edges of upper plate 118 and rollers 121 mounted in roller mounting boxes 122 (carried by lower plate 114).

A motor 35 for a light duty vehicle is characterized as follows:

| | |
|---|---|
| Power (at 10,000 rpm) | 40 HP |
| Voltage | 180 volts dc |
| Current | 166 amps dc |
| Diameter | 8.74 inches |
| Length | 8 inches |
| Weight | 30 lbs. |
| Efficiency (calculated at 10,000 rpm) | 93 to 97% |

The achievability of the above motor parameters has been confirmed by the actual design and testing of a somewhat smaller prototype motor based upon computer calculations. Parameters are as follows (based upon the use of 24 magnets, conductors 0.008 inches in diameter, and 144 flux carrying elements as brought out more fully hereinafter).

| | |
|---|---|
| Power (at 10,000 rpm) | 40 HP |
| Voltage | 72 volts dc |
| current | 425 amps dc |
| Diameter | 6.5 inches |
| Armature total thickness | 0.28 inches |
| Length | 3.5 inches |
| Weight | 15.0 lbs. |
| Efficiency (calculated at 10,000 rpm) | 97.6% |

For motor torque verification, the electromagnetic force was measured in an actual test in a linear configuration similar to that illustrated in FIG. 20 built to test computer simulation of a rotary configuration. A current of 125 amps produced a force of 50 lb.

The measured magnetic field (using Type 8 ceramic magnets) was 3500 gauss. The active conductor length spanned three of the four poles and consisted of twenty bars of copper, each 0.150×0.3125 inches in cross section. Each of the 3×20=60 conductors had an active length of three inches. Thus, the total active conductor length was 3×60=180 inches. Using these values, the force was calculated to be 45 lb. The measured force of 50 lb. compares well with calculated force of 45 lb. considering the accuracy of the test (for example, the magnetic field is not absolutely uniform everywhere, and fringing field effects were not considered).

Figure 22:
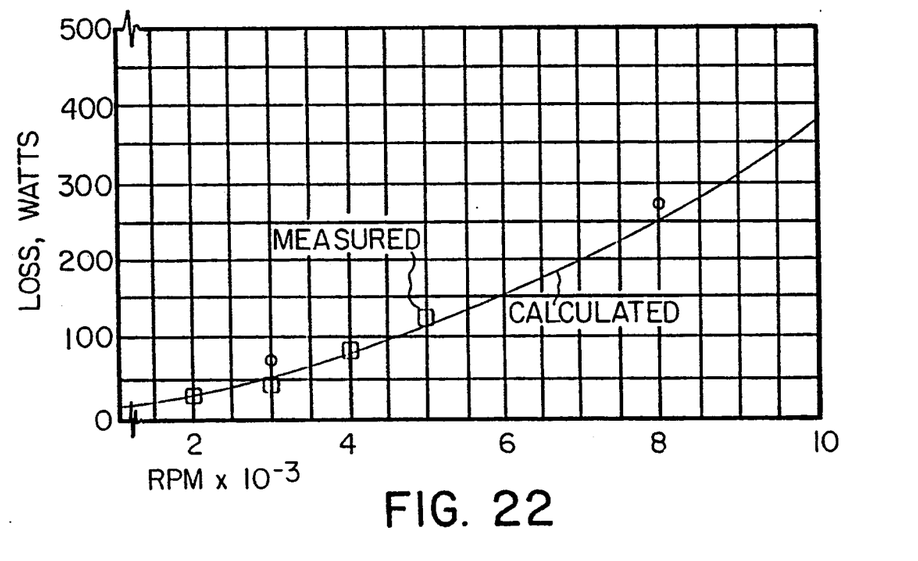

Measured eddy current, hysteresis and windage losses for a transducer constructed according to the principles and description herein are shown in the graph of FIG. 22. This motor delivered 16 horsepower at 7800 RPM in preliminary testing.

As can be appreciated from the foregoing, the electromagnetic motor is thus able to provide an output power to weight ratio that is greater than one horsepower to one pound in a cooling gas medium (using air as the cooling medium), and is believed to be greater than five horsepower to one pound in at least some cooling mediums (with five to one ratio being calculated for the prototype motor as set forth herein). It should be further appreciated from the foregoing that this invention provides an improved electromagnetic motor that is lightweight, compact, efficient and yet capable of delivering high power.

Figure 24:
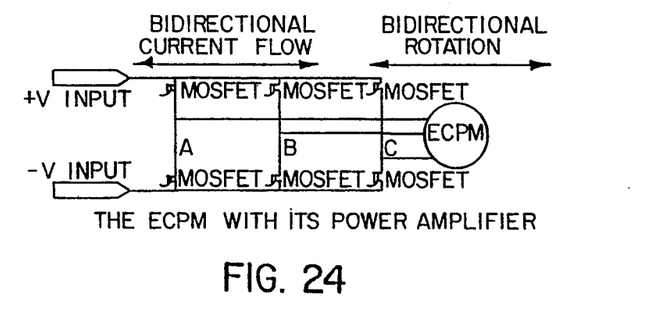
FIG. 24 is a schematic diagram indicating the relationships between the MOSFET, the track motors, and the bi-directional current flow and motor rotation.
Figure 25:
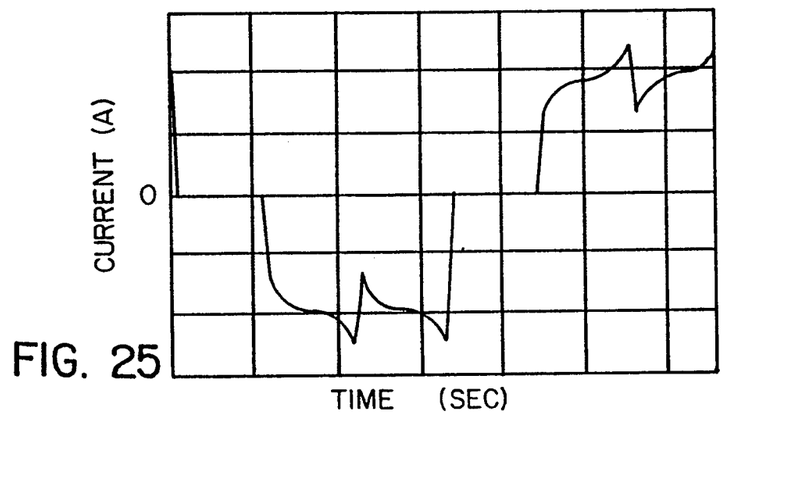
FIG. 25 is a graphical representation of the current wave form to the motors with respect to time.
Figure 26:
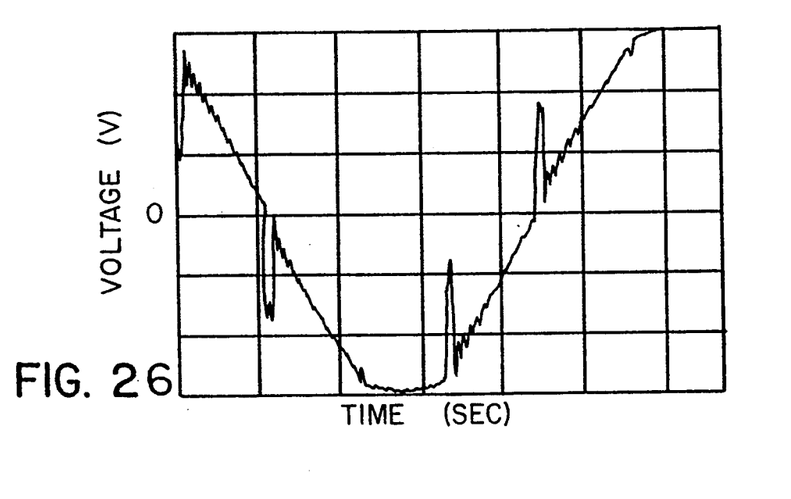
FIG. 26 is a graphical representation of the voltage applied to the motors with respect to time.
Figure 27:
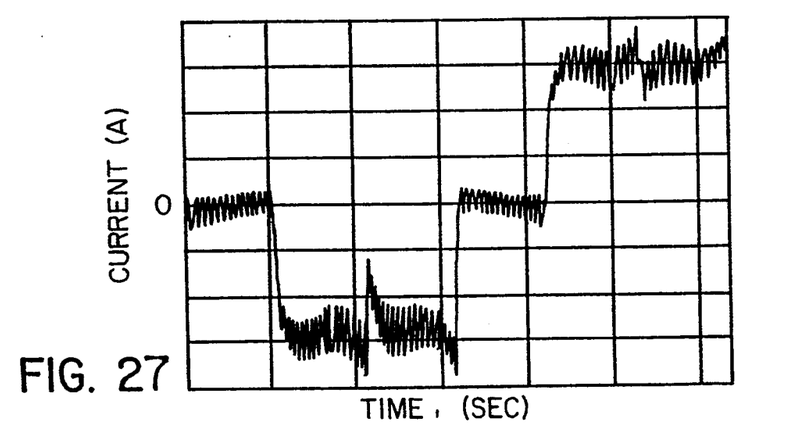
FIG. 27 is a graphical representation of the current wave form of the motor in the regeneration mode.

As stated above, the system includes a controller unit 97 and a battery pack 13 used as a source of current connected through leads 97 to connectors 89 of armature 82, so as to provide current to conductors 84 to cause rotation of rotor 70. Controller unit 98 is shown in relationship to a motor 35 and other vehicle control functions in FIG. 23, for a vehicle power and control system particular to the present inventive track powering system 10. The current controller 98 receives direct current voltage from the battery pack 13, and electronically converts the voltage into alternating polarities, so that current is provided through connecting leads 97 to the armature windings 84 of motor 35, and rapidly switched (by electronic means within controller 98) to interact with the magnetic fields provided by permanent magnets 80. By control of the frequency and direction of the applied voltage, motor 35 may be controlled to provide output shaft rotational speeds over a wide range, and to torque efficiently thereover. Motor 35 is an electronically-commutated, permanent-magnet device. Controller 98 incorporates a MOSFET based amplifier. The power amplifier functions as a dc-to-ac three phase TWM controlled buck converter to vary the applied voltages at the motor terminals, so that the speed of motor 35 can be controlled from zero to rated speed. When the motor is used for braking (in regeneration mode), the power amplifier performs as a three-phase ac-to-dc boost converter to return kinetic energy to the battery pack 13. FIG. 24 indicates the relationship between the MOSFET, the motor and the corresponding bi-directional current flows and bi-directional rotations of the motor. FIGS. 25 and 26 graphically illustrate the variations in current and voltage applied to the motor with respect to time, showing current and voltage wave forms. FIG. 25 shows a corresponding current wave form for the motor in the regeneration mode.

Figure 23:
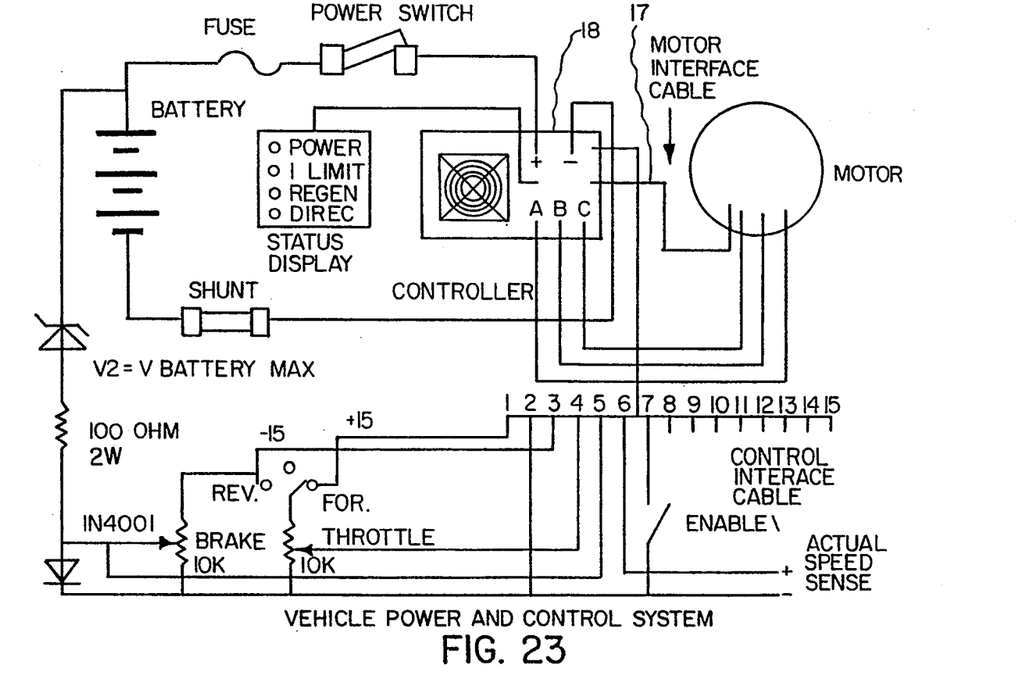
FIG. 23 is a schematic diagram indicating the MOSFET electronic controller, battery pack, track motors, along with vehicle control functions.

As seen in FIG. 23, the controller 98, with the MOSFET amplifier, interfaces both with motors 35 and with various vehicle control functions. As indicated, the motors 35 may be throttled to various rotational speeds, and are of course reversible for forward and rearward vehicle propulsion. Also included is the use of the motors 35 to brake the forward or rearward motion of the vehicle. As indicated above, this is done by momentarily changing the function of the motor to that of a generator which resists rotation of the armature, generating back current, which is stored by recharge of batteries 13.

What is claimed and desired to be secured by Letters Patent is:

1. An electrically powered drive system for an off road vehicle having a pair of endless tracks each driven by an associated sprocket to propel the vehicle over snow, said drive system comprising:

a single pair of electronically commutated, brushless, permanent magnet, alternating current traction motors, each motor associated with one of the tracks;

a source of direct current electrical voltage carried by the vehicle;

a current controller including electronic switching means converting direct current into alternating current, and means for controlling the alternating current voltage output for application to the motors;

electrical circuit means connecting the direct current electrical voltage source, the current controller and the traction motors, said circuit means including control switching means independently controlling current to each of said motors; and a single pair of power trains each power trainer connecting one of the motors to the sprocket of its associated endless track.

2. The drive system of claim 1, wherein:

the current controller performs in a regeneration mode as an alternating current to direct current converter to return kinetic energy in electrical form to the source of direct current voltage.

3. The drive system of claim 2, wherein each alternating current traction motor comprises:

a housing;

a shaft mounted on said housing to rotate relatively thereto;

a magnetic field-generating rotor secured to said shaft to rotate therewith, said rotor having a mounting disk connected to said shaft and an annular wall means mounted thereon being selected from among (i) a first annular wall means having a first magnetic means mounted thereon for generating a magnetic flux and (ii) a second annular wall means comprising an outer annular wall and an inner annular wall both mounted upon said mounting disk and spaced radially apart to define an annular gap therebetween, said inner annular wall being spaced radially apart from said shaft, and a second magnetic means for generating a magnetic flux mounted on at least one of said inner annular wall and said outer wall; and an armature, for intercepting said magnetic flux, fixed to said housing, said armature comprising an annular member, the position of which is selected to be from among (i) a position radially adjacent said first annular wall means and (ii) a position at least partially within said gap between said inner annular wall and said outer wall of said rotor, said armature including (i) a plurality of spaced sections of electrical conductors, each section including a plurality of separate conductive wires insulated from each other and (ii) a plurality of magnetic flux carrying elements interposed between said sections of electrical conductors, each flux carrying element comprising a member pressed from highly magnetically permeable particles and a binder material for binding said particles together.

4. The drive system of claim 3, wherein:

the first and second magnetic means are permanent magnets; and the motor delivers high torque at high efficiency in the range of zero to 10,000 revolutions per minute, and delivers at least one horsepower per pound of the weight thereof.

5. The drive system of claim 4, wherein each of the power trains comprises:

a first gear reducer joining with the motor;

a hydraulic disc brake joining with the first gear reducer; and a second gear reducer joining with the disc brake and the sprocket.

* * * * *